United States Patent
Yegani et al.

(10) Patent No.: US 8,599,800 B2
(45) Date of Patent: Dec. 3, 2013

(54) ASSIGNING AN ACCESS TERMINAL IDENTIFIER TO A MOBILE NODE

(75) Inventors: Parviz Yegani, Danville, CA (US);
Anand K. Oswal, Sunnyvale, CA (US);
Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 11/382,169

(22) Filed: May 8, 2006

(65) Prior Publication Data
US 2007/0258416 A1 Nov. 8, 2007

(51) Int. Cl.
*H04B 1/40* (2006.01)

(52) U.S. Cl.
USPC .......................................... 370/338; 455/450

(58) Field of Classification Search
USPC ....................................................... 455/450
See application file for complete search history.

(56) References Cited

U.S. PATENT DOCUMENTS

| | | | |
|---|---|---|---|
| 6,473,411 B1 * | 10/2002 | Kumaki et al. | 370/331 |
| 6,961,329 B1 * | 11/2005 | Bender et al. | 370/342 |
| 7,006,472 B1 * | 2/2006 | Immonen et al. | 370/332 |
| 7,848,749 B2 * | 12/2010 | Nair et al. | 455/435.1 |
| 2002/0154627 A1 * | 10/2002 | Abrol et al. | 370/352 |
| 2003/0026240 A1 * | 2/2003 | Eyuboglu et al. | 370/349 |
| 2004/0015607 A1 * | 1/2004 | Bender et al. | 709/238 |
| 2004/0218587 A1 * | 11/2004 | Kim et al. | 370/352 |
| 2004/0224698 A1 * | 11/2004 | Yi et al. | 455/450 |
| 2005/0113082 A1 * | 5/2005 | Bender et al. | 455/422.1 |
| 2005/0207368 A1 * | 9/2005 | Nam | 370/320 |
| 2006/0089154 A1 * | 4/2006 | Laroia et al. | 455/456.2 |
| 2006/0104244 A1 * | 5/2006 | Kanagawa | 370/331 |
| 2006/0187883 A1 * | 8/2006 | Abrol et al. | 370/331 |
| 2007/0153728 A1 * | 7/2007 | Le et al. | 370/329 |

\* cited by examiner

*Primary Examiner* — Marcos Batista
*Assistant Examiner* — Frank Donado
(74) *Attorney, Agent, or Firm* — Baker Botts L.L.P.

(57) ABSTRACT

Assigning an access terminal identifier to a mobile node includes receiving a request at an access terminal home agent of a radio access network. The request requests an access terminal identifier for the mobile node. An access terminal identifier is assigned to the mobile node. The access terminal identifier identifies a communication session of the mobile node, and is assigned according to an Internet Protocol procedure for assigning an address. The access terminal identifier is provided to the mobile node.

20 Claims, 1 Drawing Sheet

ASSIGNING AN ACCESS TERMINAL IDENTIFIER TO A MOBILE NODE

TECHNICAL FIELD

This invention relates generally to the field of telecommunications and more specifically to assigning an access terminal identifier to a mobile node.

BACKGROUND

A device of a communication system may be assigned an identifier that identifies the device and a communication session of the device. As an example, a base station may use an identifier assigned to a mobile node to manage a communication session for the mobile node.

Known techniques for assigning identifiers to mobile nodes, however, are not suitable in certain situations. It is generally desirable to have suitable techniques for assigning identifiers to mobile nodes.

SUMMARY OF THE DISCLOSURE

In accordance with the present invention, disadvantages and problems associated with previous techniques for assigning an access terminal identifier to a mobile node may be reduced or eliminated.

According to one embodiment of the present invention, assigning an access terminal identifier to a mobile node includes receiving a request at an access terminal home agent of a radio access network. The request requests an access terminal identifier for the mobile node. An access terminal identifier is assigned to the mobile node. The access terminal identifier identifies a communication session of the mobile node, and is assigned according to an Internet Protocol procedure for assigning an address. The access terminal identifier is provided to the mobile node.

Certain embodiments of the invention may provide one or more technical advantages. A technical advantage of one embodiment may be that a radio access network has an access terminal home agent. The access terminal home agent may operate as a radio access network home agent for a mobile node, and may assign to the mobile node an access terminal identifier that operates like an Internet Protocol (IP) address.

Another technical advantage of one embodiment may be that the access terminal identifier may be assigned according to any suitable protocol for assigning an IP address. Accordingly, the access terminal identifier may be used to perform common mobility procedures.

Another technical advantage of one embodiment may be that the mobile node and the radio access network may use the access terminal identifier to communicate during a communication session. Another technical advantage of one embodiment may be that the access terminal identifier may include an identifier of a previous radio access network device. A current radio access network device may identify the previous radio access network device from the access terminal identifier.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
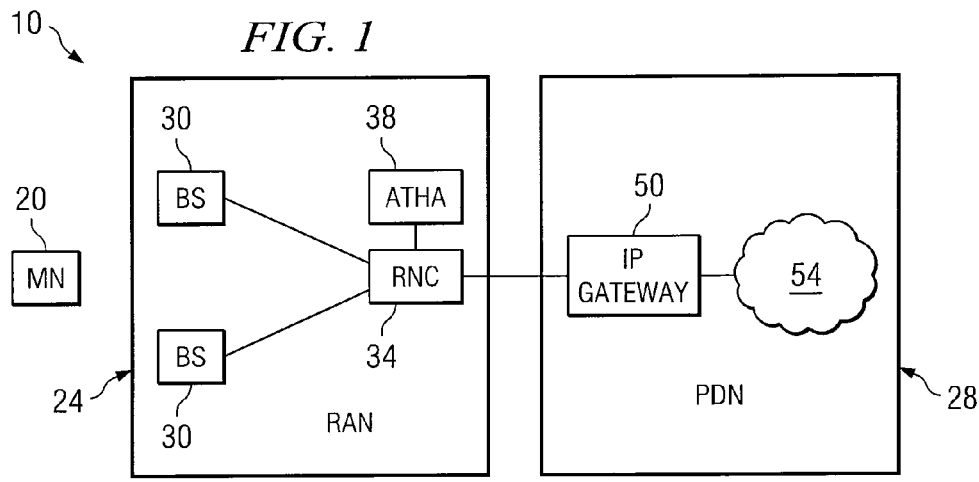
FIG. 1 is a block diagram illustrating one embodiment of a system that includes a mobile node for which an access terminal identifier (ATI) may be assigned.
Figure 2:
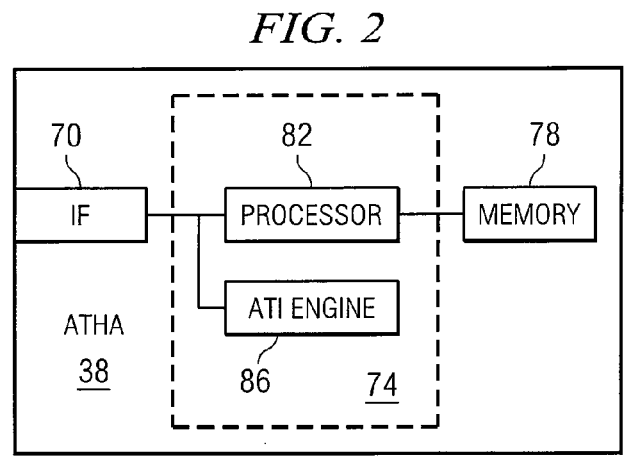
FIG. 2 is a block diagram illustrating one embodiment of an access terminal home agent that may be used with the system of FIG. 1.
Figure 3:
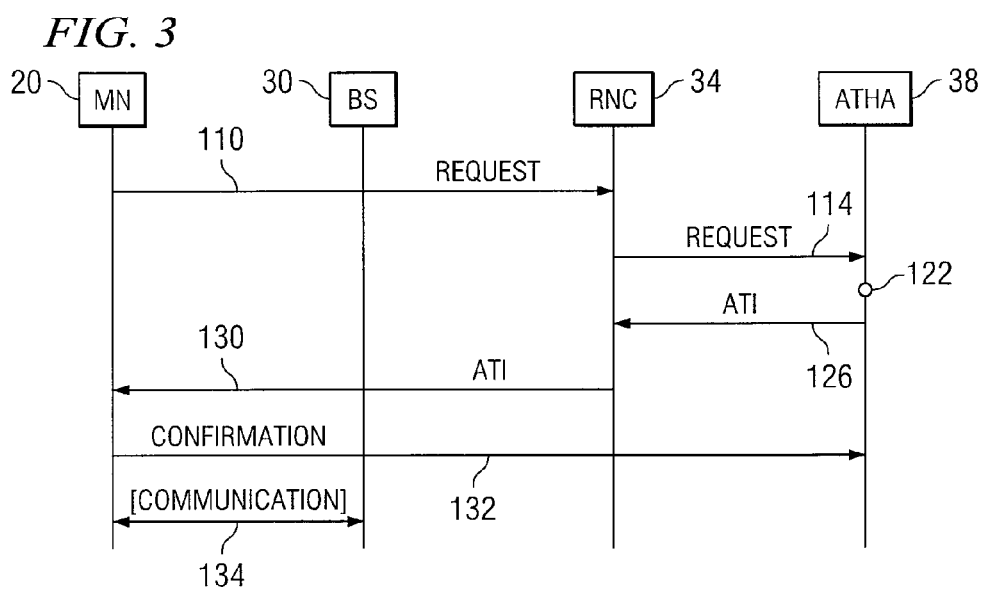
FIG. 3 is a call flow diagram illustrating one embodiment of a method for assigning an access terminal identifier that may be used by the access terminal home agent of FIG. 2.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 that includes a mobile node 20 for which an access terminal identifier (ATI) may be assigned. According to the embodiment, system 10 includes a radio access network 24 that has an access terminal home agent 38. Access terminal home agent 38 may operate as a radio access network home agent for mobile node 20, and may assign an access terminal identifier that operates like an IP address. Mobile node 20 and radio access network 24 may use the access terminal identifier to communicate during a communication session.

According to the illustrated embodiment, system 10 operates to provide services such as communication sessions to endpoints such as mobile node 20. A communication session may refer to an active communication between endpoints, measured from endpoint to endpoint.

Information is communicated during a communication session. Information may refer to voice, data, text, audio, video, multimedia, control, signaling, other information, or any combination of the preceding. System 10 may communicate information in packets. A packet may comprise a bundle of data organized in a specific way for transmission, and a frame may comprise the payload of one or more whole or partial packets organized in a specific way for transmission. A packet-based communication protocol such as Internet Protocol (IP) may be used to communicate the packets.

System 10 may utilize communication protocols and technologies to provide communication sessions. Example communication protocols and technologies include those of the Institute of Electrical and Electronics Engineers, Inc. (IEEE) 802.xx standards such as the 802.11 and 802.16 standards (for example, the 802.16e standards), the International Telecommunications Union (ITU-T) standards, the European Telecommunications Standards Institute (ETSI) standards, the Internet Engineering Task Force (IETF) standards, the Third Generation Partnership Project 2 (3GPP2) CDMA2000 High Rate Packet Data (HRPD) standards, or other standards.

System 10 includes components such as network devices. In general, a network device may include any suitable arrangement of components operable to perform the operations of the underlying network, and may comprise logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

System ID may include communication networks. In general, a communication network allows devices to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network such as a 3GPP/3GPP2 mobile network, an enterprise intranet, other suitable communication link, or any combination of the preceding. According to one embodiment, system 10 may comprise one or more 3GPP2 Code Division Multiple Access (CDMA) high rate packet data (HRPD) networks.

According to the illustrated embodiment, system 10 includes a mobile node 20, a radio access network (RAN) 24, and a packet data network (PDN) 28. Radio access network 24 includes one or more base stations (BSs) 30, a radio network controller (RNC) 34, and an access terminal home agent (ATHA) 38. Packet data network 28 includes an IP gateway 50 and an IP network 54.

According to the illustrated embodiment, mobile node 20 represents any suitable device operable to communicate with a communication system. Mobile node 20 may comprise, for example, a personal digital assistant, a computer such as a laptop, a cellular telephone, a mobile handset, or any other device operable to communicate with system 10.

Radio access network 24 represents a communication network that provides mobile node 20 access to a wired network. Radio access network 24 may be provided by a network access provider that provides a radio access infrastructure to one or more network service providers. According to one embodiment, radio access network 24 may comprise an HPRD access service network provided by a network access provider that provides a CDMA radio access infrastructure to 3GPP2 network service providers.

Radio access network 24 includes radio access network devices, such as one or more base stations 30, a radio network controller 34, and an access terminal home agent 38. A base station 32 represents any suitable device system that provides wireless services to a mobile node 20 present in, or visiting, a cell of base station 32. For example, base station 32 may represent an access location that couples a wireless network, such as a wireless radio network, to a wired network, such as a wide area network. A cell may refer to a geographic unit serviced by a base station 32.

Base station 32 may comprise suitable devices operable to provide wireless services to mobile nodes 20 present in a cell. According to one embodiment, base station 32 includes a base transceiver station. The base transceiver station communicates signals to and from mobile node 20 through a wireless link that is typically a radio frequency link. Radio network controller 34 manages base stations 32, and may perform operations similar to that of a base station controller.

Access terminal home agent 38 may operate as a home agent for mobile nodes 20 accessing radio access network 24. Mobile nodes 20 accessing radio access network 24 may comprise mobile nodes 20 served by radio network controller 34 of radio access network 24. According to one embodiment, access terminal home agent 38 may assign access terminal identifiers that operate like IP addresses. A mobile node 20 and radio access network 24 may use the access terminal identifier to communicate during a communication session. Access terminal home agent 38 is described in more detail with reference to FIG. 2.

Packet data network 28 may represent a communication network operable to communicate data in packets. Packet data network 28 includes an IP gateway 50 and an IP network 54. IP gateway 50 may represent a device operable to provide an interface to IP network 54. Gateway 36 may perform any suitable operations. For example, gateway 36 may convert communications between different communication protocols. For example, gateway 36 may convert communications from a protocol used by IP network 54 to a different protocol, or vice-versa. IP network 54 may represent a communication network operable to communicate packets according to the Internet Protocol.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of an access terminal home agent 38 that may be used with system 10 of FIG. 1. According to the illustrated embodiment, access terminal home agent 38 includes an interface 70, logic 74, and a memory 78. Logic 74 includes a processor 82 and an access terminal identifier (ATI) engine 86. Interface 70, logic 74, processor 82, and memory 78 may be as described with reference to FIG. 1.

According to one embodiment, access terminal home agent 38 may operate as a home agent for a mobile node 20 accessing radio access network 24. ATI engine 84 may assign an access terminal identifier, such as a unicast access terminal identifier (UATI), that operates like an IP address, such as an IPv6 address. The access terminal identifier may be used by mobile node 20 and radio access network 24 to identify a communication session to communicate during the session.

An identifier may be assigned in any suitable manner. According to one embodiment, an identifier may be assigned according to a procedure for assigning an IP address, such as according to the Dynamic Host Configuration Protocol (DHCP). As an example, ATI engine 84 may generate an IP address, and send the IP address to mobile node 20. As another example, ATI engine 84 may provide a prefix to mobile node 20. Mobile node 20 may then generate an IP address from the prefix and another identifier, such as an interface identifier provided by IP gateway 50 or generated by mobile node 20.

The assignment may be made at any suitable point. As a first example, the access terminal identifier may be assigned during initial access to radio access network 24. As a second example, the access terminal identifier may be assigned during a handoff, such as a handoff from a source radio network controller 34 to a target radio network controller 34. As a third example, the access terminal identifier may be assigned in response to a trigger event defined according to a lower level technique. For example, a radio signal strength that is lower than a predetermined minimum threshold may trigger a reassignment.

An access terminal identifier may be used for any suitable operation, such as a mobility operation. As a first example, mobile node 20 and radio access network 24 may use the access terminal identifier to communicate during a communication session. As second example, the access terminal identifier may be used to identify a communication session during a handoff from a source radio access network device to a target radio access network device. The target radio access network device may use the identifier to retrieve state information for the communication session from the source radio access network device. Example radio access network devices include base stations 30 and radio network controllers 38.

An access terminal identifier may have any suitable format, and may be of any suitable size, for example, 128 bits. According to one embodiment, an access terminal identifier may include one or more other identifiers that may be used to identify mobile node 20, radio access network devices used by mobile node 20, or both. As an example, an access terminal identifier may include a base transceiver station identifier and a mobile node identifier. The base transceiver identifier may identify a base transceiver station 40, and the mobile node identifier may identify mobile node 20. As another example, an access terminal identifier may include a gateway link identifier and a mobile node identifier. The gateway link identifier may identify the port of gateway 50 used by mobile node 20.

If the access terminal identifier includes the identifier of a radio access network device previously used by mobile node 20, a next radio access network device may identify the previous device from the access terminal identifier. As an example, an access terminal identifier may include a base station identifier of the previous base station 30. The next base station 30 might identify the previous base station 30 from the access terminal identifier and may establish communication with the previous base station 30. The next base station 30 may determine from the previous base station 30 whether mobile node 20 already has an open communication session.

Modifications, additions, or omissions may be made to access terminal home agent 38 without departing from the scope of the invention. The components of access terminal home agent 38 may be integrated or separated according to particular needs. Moreover, the operations of access terminal home agent 38 may be performed by more, fewer, or other modules. Additionally, operations of access terminal home agent 38 may be performed using any suitable logic.

FIG. 3 is a call flow diagram illustrating one embodiment of a method for assigning an access terminal identifier that may be used by access terminal home agent 38 of FIG. 2.

The method begins at step 110, where radio network controller 34 receives a request to assign an access terminal identifier to mobile node 20. The request may be received when mobile node 20 initially accesses packet data network 28, is handed off between a source radio network controller 34 and a target radio network controller 34, or triggers a reassignment according to a lower level technique.

Radio network controller 34 forwards the assignment request to access terminal home agent 38 at step 114. Access terminal home agent 38 assigns an access terminal identifier at step 122. Access terminal home agent 38 may assign a unicast access terminal identifier that operates like an IPv6 address. The access terminal identifier is sent to radio network controller 34 at step 126. Radio network controller 34 forwards the access terminal identifier to mobile node 20 at step 130. Mobile node 20 sends a confirmation message to access terminal home agent 38 at step 132 to confirm the completion of the assignment. For example, mobile node 20 may send a UATI complete message to confirm the completion of the UATI assignment. Mobile node 20 may use the access terminal identifier to communicate with radio network controller 34 at step 134. After using the access terminal identifier, the method terminates.

Use of this embodiment may be detected in any suitable manner. For example, over-the-air packets may be sniffed to determine if the packets perform the operations of the method. As another example, a debug procedure may be performed on a home agent to determine if the home agent is performing the operations of the method. As yet another example, home agent product documentation may describe whether the home agent is performing the operations of the method.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a radio access network has an access terminal home agent. The access terminal home agent may operate as a radio access network home agent for a mobile node, and may assign to the mobile node an access terminal identifier that operates like an Internet Protocol (IP) address.

Another technical advantage of one embodiment may be that the access terminal identifier may be assigned according to any suitable protocol for assigning an IP address. Accordingly, the access terminal identifier may be used to perform common mobility procedures.

Another technical advantage of one embodiment may be that the mobile node and the radio access network may use the access terminal identifier to communicate during a communication session. Another technical advantage of one embodiment may be that the access terminal identifier may include an identifier of a previous radio access network device. A current radio access network device may identify the previous radio access network device from the access terminal identifier.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method of assigning an access terminal identifier to a mobile node, comprising: receiving a request at an access terminal home agent of a radio access network (RAN), the request requesting an access terminal identifier for a mobile node, the access terminal identifier identifying a communication session of the mobile node and configured to operate as an Internet Protocol (IP) address by which a packet data network routes packets to the mobile node, the same access terminal identifier configured to operate as a unicast access terminal identifier (UATI) with respect to the RAN in order to facilitate communicating information from a previous RAN device to a next RAN device, where the access terminal identifier includes a base station identifier of a previous base station that allows a next base station to identify the previous base station, the information describing the communication session identified by the access terminal identifier; assigning, by the access terminal home agent, at least a prefix of the access terminal identifier to the mobile node, the prefix indicating a first portion of the access terminal identifier, the prefix assigned according to a Dynamic Host Configuration Protocol (DHCP) procedure; and providing at least the prefix of the access terminal identifier to the mobile node.

2. The method of claim 1, wherein the same access terminal identifier facilitates communicating IP packets between the packet data network and the mobile node and communicating radio signals between the radio access network and the mobile node.

3. The method of claim 1, wherein the access terminal identifier comprises:
a device identifier of a radio access network device used by the mobile node, the radio access network device identifiable by a next radio access network device from the access terminal identifier.

4. The method of claim 3, wherein the radio access network device comprises at least one of:
a base station; and
a radio network controller.

5. The method of claim 1, wherein:
the access terminal identifier is operable to allow the mobile node and the radio access network to identify the communication session.

6. The method of claim 1, wherein assigning the access terminal identifier to the mobile node further comprises:
assigning an Internet Protocol address according to a Dynamic Host Configuration Protocol.

7. A home agent operable to assign an access terminal identifier to a mobile node, comprising: an interface operable to: receive a request requesting an access terminal identifier for a mobile node, the access terminal identifier identifying a communication session of the mobile node and configured to operate as an Internet Protocol (IP) address by which a packet data network routes packets to the mobile node, the same access terminal identifier configured to operate as a unicast access terminal identifier (UATI) with respect to the RAN in order to facilitate communicating information from a previous RAN device to a next RAN device, where the access terminal identifier includes a base station identifier of a previous base station that allows a next base station to identify the previous base station, the information describing the communication session identified by the access terminal identifier; and a processor operable to: assign at least a prefix of the access terminal identifier to the mobile node, the prefix indicating a first portion of the access terminal identifier, the prefix assigned according to a Dynamic Host Configuration Protocol (DHCP) procedure; and provide at least the prefix of the access terminal identifier to the mobile node.

8. The home agent of claim 7, wherein the same access terminal identifier facilitates communicating IP packets between the packet data network and the mobile node and communicating radio signals between the radio access network and the mobile node.

9. The home agent of claim 7, wherein the access terminal identifier comprises:
a device identifier of a radio access network device used by the mobile node, the radio access network device identifiable by a next radio access network device from the access terminal identifier.

10. The home agent of claim 9, wherein the radio access network device comprises at least one of:
a base station; and
a radio network controller.

11. The home agent of claim 7, wherein:
the access terminal identifier is operable to allow the mobile node and the radio access network to identify the communication session.

12. The home agent of claim 7, the processor further operable to assign the access terminal identifier to the mobile node by:
assigning an Internet Protocol address according to a Dynamic Host Configuration Protocol.

13. The home agent of claim 7, wherein:
the access terminal identifier comprises:
a device identifier of a radio access network device used by the mobile node, the radio access network device identifiable by a next radio access network device from the access terminal identifier;
the radio access network device comprises at least one of:
a base station; and
a radio network controller;
the access terminal identifier is operable to:
allow the mobile node and the radio access network to identify the communication session; and
the processor is further operable to:
assign the access terminal identifier to the mobile node by:
assigning an Internet Protocol address according to a Dynamic Host Configuration Protocol.

14. Logic for assigning an access terminal identifier to a mobile node, the logic embodied in a non-transitory computer-readable medium and operable to: receive a request requesting an access terminal identifier for a mobile node, the access terminal identifier identifying a communication session of the mobile node and configured to operate as an Internet Protocol (IP) address by which a packet data network routes packets to the mobile node, the same access terminal identifier configured to operate as a unicast access terminal identifier (UATI) with respect to the RAN in order to facilitate communicating information from a previous RAN device to a next RAN device, where the access terminal identifier includes a base station identifier of a previous base station that allows a next base station to identify the previous base station, the information describing the communication session identified by the access terminal identifier; and a processor operable to: assign at least a prefix of the access terminal identifier to the mobile node, the prefix indicating a first portion of the access terminal identifier, the prefix assigned according to a Dynamic Host Configuration Protocol (DHCP) procedure; and provide at least the prefix of the access terminal identifier to the mobile node.

15. The logic of claim 14, wherein the same access terminal identifier facilitates communicating IP packets between the packet data network and the mobile node and communicating radio signals between the radio access network and the mobile node.

16. The logic of claim 14, wherein the access terminal identifier comprises:
a device identifier of a radio access network device used by the mobile node, the radio access network device identifiable by a next radio access network device from the access terminal identifier.

17. The logic of claim 16, wherein the radio access network device comprises at least one of:
a base station; and
a radio network controller.

18. The logic of claim 14, wherein:
the access terminal identifier is operable to allow the mobile node and the radio access network to identify the communication session.

19. The logic of claim 14, further operable to assign the access terminal identifier to the mobile node by:
   assigning an Internet Protocol address according to a Dynamic Host Configuration Protocol.

20. A system for assigning an access terminal identifier to a mobile node, comprising: means for receiving a request at an access terminal home agent of a radio access network (RAN), the request requesting an access terminal identifier for a mobile node, the access terminal identifier identifying a communication session of the mobile node and configured to operate as an Internet Protocol (IP) address by which a packet data network routes packets to the mobile node, the same access terminal identifier configured to operate as a unicast access terminal identifier (UATI) with respect to the RAN in order to facilitate communicating information from a previous RAN device to a next RAN device, where the access terminal identifier includes a base station identifier of a previous base station that allows a next base station to identify the previous base station, the information describing the communication session identified by the access terminal identifier; means for assigning, by the access terminal home agent, at least a prefix of the access terminal identifier to the mobile node, the prefix indicating a first portion of the access terminal identifier, the prefix assigned according to a Dynamic Host Configuration Protocol (DHCP) procedure; and means for providing at least the prefix of the access terminal identifier to the mobile node.

* * * * *